United States Patent
Kangude et al.

(10) Patent No.: US 7,746,879 B2
(45) Date of Patent: Jun. 29, 2010

(54) MESH DETERMINISTIC ACCESS

(75) Inventors: Shantanu Kangude, Dallas, TX (US); Harshal Chhaya, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 943 days.

(21) Appl. No.: 11/468,133

(22) Filed: Aug. 29, 2006

(65) Prior Publication Data

US 2007/0060141 A1 Mar. 15, 2007

Related U.S. Application Data

(60) Provisional application No. 60/712,078, filed on Aug. 29, 2005.

(51) Int. Cl.
*H04L 12/56* (2006.01)
(52) U.S. Cl. ............ 370/406; 370/407; 370/408; 370/410; 370/412; 370/254; 370/338; 455/343.4
(58) Field of Classification Search ......... 370/406–408, 370/254, 338; 455/343.4
See application file for complete search history.

(56) References Cited

U.S. PATENT DOCUMENTS 7,564,826 B2 * 7/2009 Sherman et al. ............. 370/338
2005/0058151 A1 * 3/2005 Yeh ............................. 370/445
2006/0050742 A1 * 3/2006 Grandhi et al. ............. 370/506
2006/0268792 A1 * 11/2006 Belcea ......................... 370/338

* cited by examiner

*Primary Examiner*—Vincent P Harper
*Assistant Examiner*—Michael Irace
(74) *Attorney, Agent, or Firm*—Steven A. Shaw; W. James Brady; Frederick J. Telecky, Jr.

(57) ABSTRACT

A deterministic access system and method is provided that may be used for gaining access to a shared communication medium in a mesh or decentralized network. The deterministic access method enables QoS prioritization for periodic data flows such as those used in streaming media or VOIP communications without the direction of a central controller. The method provides a way for network nodes to schedule communications that take into account the hidden node problem, provide priority access to the communication medium for high QoS data flows, and provide shared access to the medium for lower priority data packets during unscheduled times. The method also enables both backward and forward compatibility with network communication methods as well as interoperability between mesh networks and conventional networks.

2 Claims, 3 Drawing Sheets

MESH DETERMINISTIC ACCESS

CROSS-REFERENCE TO RELATED APPLICATIONS

This application claims priority to U.S. Provisional Application No. 60/712,078, filed Aug. 29, 2005, entitled "QoS Mechanism: Mesh Deterministic Access", Shantanu Kangude et al., which is incorporated herein by reference for all purposes.

BACKGROUND

Maintaining data availability, from being able to remotely access e-mail to being able to remotely access files on a hard drive, has been a challenge for many years. Various networking solutions for connecting diverse computing equipment have been developed in order to satisfy the needs for data availability. Most recently, wireless networks have undergone development such that continuous data availability may be provided to any number of computing devices without requiring a physical connection to a network. The continuous data availability provided by wireless networks has enabled innovation in the form of a growing list of wireless devices and services that may be offered.

Some services now being provided through wireless networks include streaming media and voice over internet protocol (VOIP), both of which require large amounts of bandwidth for extended periods of time. In a wireless environment each of these services that provide periodic flows of data must compete for bandwidth and transmission time with other services that may not be as time sensitive, such as e-mail. Quality of Service (QoS) generally refers to the probability of a packet of data succeeding in passing between two points or nodes in a network with low latencies. Therefore, a need exists to improve the QoS for services such as streaming media and VOIP when contentions with other less time sensitive services may occur, especially in decentralized or wireless networks.

SUMMARY

Disclosed herein is a method for communicating in a decentralized network by a network node determining a schedule of communication times with adjacent nodes. The network node advertises the schedule; of communication times. The network node also determines a schedule of communication times of one or more adjacent nodes and advertises the schedule of communication times of the one or more adjacent nodes.

Also disclosed herein is a: mesh point in a mesh network, comprising a transceiver operable to receive transmissions from one or more adjacent mesh points and transmit signals to one or more adjacent mesh points. The mesh point further comprises a processor programmed to determine a schedule of communication times and determine a schedule of communication times of at least one of the adjacent mesh points. The processor promotes the transceiver to broadcast a communication report including the at least some of the scheduled communication times, and an interference report including at least some of the scheduled communication times of the at least one adjacent mesh point.

Further disclosed herein is a decentralized network, comprising a first node having at least some scheduled communication times; a second node having at least some scheduled communication times. The second node is operable to broadcast a communication report including the at least some of the scheduled communication times and an interference report including the at least some of the scheduled communication times of the first node.

Still further disclosed herein is a computer data signal embodied in a carrier wave comprising an advertisement information element identifying at least a communication report indicating scheduled communication times of a network node and an interference report indicating scheduled communication times of one or more nodes adjacent to the node.

These and other features and advantages will be more clearly understood from the following detailed description taken in conjunction with the accompanying drawings and claims.

BRIEF DESCRIPTION OF THE DRAWINGS

For a more complete understanding of the disclosure and the advantages thereof, reference is now made to the following brief description, taken in connection with the accompanying drawings and detailed description, wherein like reference numerals represent like parts.

DETAILED DESCRIPTION

Figure 1:
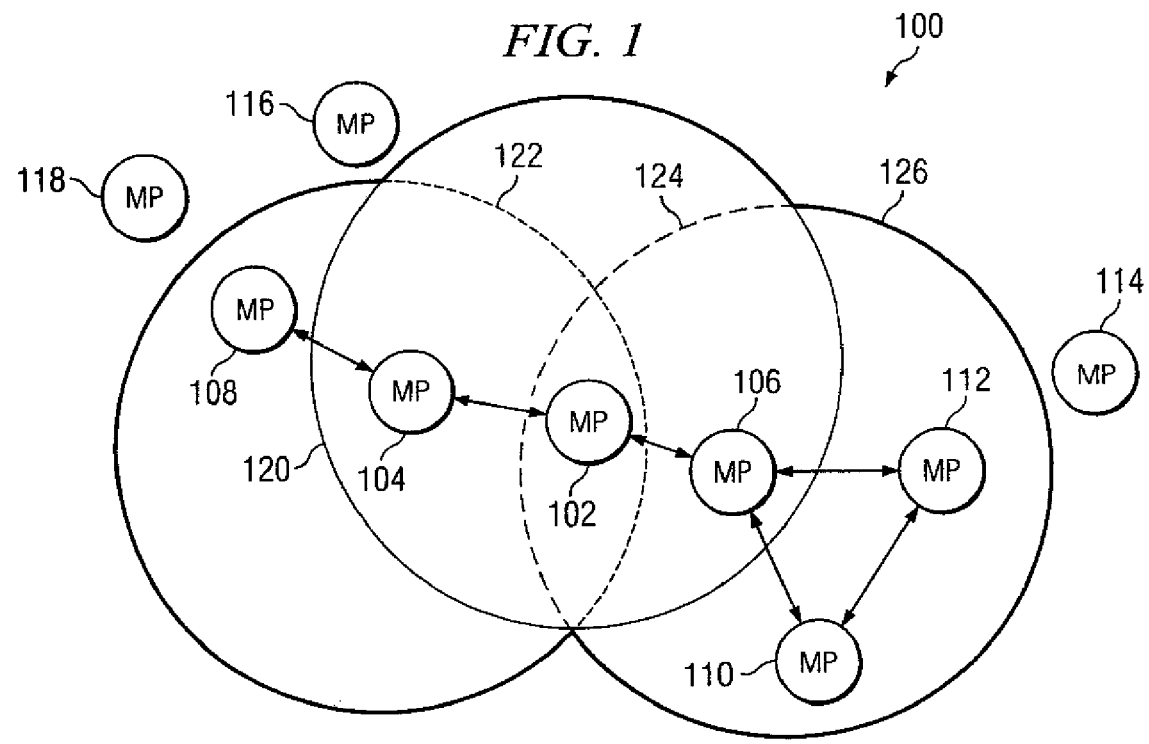
FIG. 1 illustrates an exemplary wireless mesh network.

It should be understood at the outset that although an illustrative implementation of one embodiment of the disclosure is illustrated below, the system may be implemented using any number of techniques, whether currently known or in existence. The disclosure should in no way be limited to the illustrative implementations, drawings, and techniques illustrated below, including the exemplary design and implementation illustrated and described herein, but may be modified within the scope of the appended claims along with their full scope of equivalents.

Disclosed herein is a deterministic access method that may be used for gaining access to a shared communication medium in a mesh or decentralized network. The deterministic access method promotes QoS prioritization for periodic data flows such as those used in streaming media or VOIP communications without the direction of a central controller The method provides a way for network nodes to schedule communications that take into account the hidden node problem, provide priority access to the communication medium for high QoS data flows, and provide shared access to the medium for lower priority data packets during unscheduled times. The method also enables both backward and forward compatibility with network communication methods as well as interoperability between mesh networks and conventional networks.

Conventional wireless networks comprise various wireless clients, or nodes, that send and receive data with a wireless access point (WAP). The WAP provides a centralized point for each; wireless client within the transmission range of the WAP to connect to other computing devices or networks, such as the internet. For example, a WAP may be a wireless router and a wireless client may be a laptop computer. The wireless router may connect the laptop computer to the internet, a home network, or both. The WAP acts as a repeater for directing data between a wireless client and the other computing device(s) or network(s). In the example used above, the wireless router may be used to transmit data between a desktop computer on the home network and the laptop computer. The centralized nature of this conventional wireless network creates a high potential for failure since if a WAP fails for any reason, then all of the wireless devices connected to that WAP may not send/receive data unless they are within range of another WAP. Further, the conventional wireless networks are not readily scalable since each WAP may have a limited capacity, wherein, in order to increase the number of wireless devices that may be connected or the amount of bandwidth that each wireless device may use, additional WAPs may need to be added.

Conventional wireless devices share access to the wireless medium (air) in the 2.4 GHz band using the 802.11 specification. The 802.11 specification uses the Distributed Coordinated Function (DCF) and the Point Coordinated Function (PCF) to share access to the wireless medium for: multiple wireless terminals. PCF defines two periods called the Contention Free Period (CFP) and the Contention Period (CP). During the CP the DCF is used as described in more detail below. During the CFP, a centralized controller, such as a WAP, polls each wireless station for access to the wireless medium in a round-robin fashion, for example. The DCF relies on carrier sense multiple access with collision avoidance (CSMACA) for wireless terminals to gain access to the wireless medium.

In CSMACA, prior to transmitting data on the wireless medium, a wireless terminal first determines if there are any other wireless terminals currently transmitting on the wireless medium. If no other wireless terminal is transmitting, then after waiting an appropriate amount of time, defined as an inter-frame spacing (IFS) interval, the wireless terminal may begin to transmit its data. If another wireless terminal is transmitting, then a backoff process is used. In the backoff process, a wireless terminal may select a random number within a range defined as the contention window (CW). The wireless terminal may then wait for a period of time as defined by the random number selected before attempting to retransmit its data. If a collision is again detected then the CW may be increased in order to decrease the probability of another collision. While providing a process for sharing access to the wireless medium without a central controller, CSMA/CA still may have a large number of collisions due to the hidden node problem.

The hidden node problem is easiest to understand through an example referring to FIG. 1. If both MP 102 and MP 110 are trying to transmit data to MP 106 then a collision may occur using the CSMA/CA process. This is because MP 102 can not sense if MP 110 is transmitting since MP 102 is outside the transmission range of MP 110, and vice versa. This may lead to both MPs 102 and 110 transmitting at the same time without initiating a backoff procedure, and the data received at MP 106 may be corrupted due to interference between the two transmissions.

Figure 2:
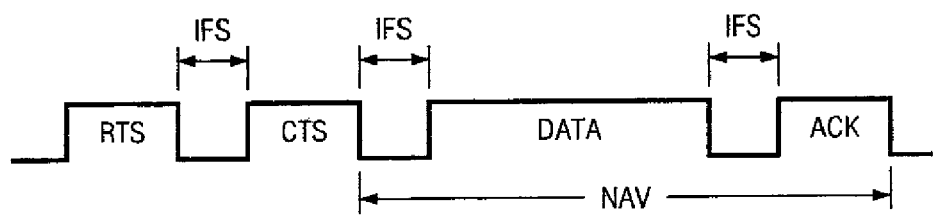
FIG. 2 illustrates an exemplary RTS/CTS handshake.

In order to help solve the hidden node problem, a handshaking process RTS/CTS depicted in FIG. 2 may be used in conjunction with CSMA/CA. Referring to FIG. 1, if MP 102 wishes to send data to MP 104 the handshake process depicted in FIG. 2 may be initiated by MP 102 broadcasting a request to send (RTS) frame. The RTS frame may identify the source of data transmission, MP 102, the destination of the data transmission, MP 104, and the duration of the transmission. After receiving the RTS frame, MP 104 may wait for an IFS interval. If MP 104 is ready to receive the data, it may broadcast a clear to receive (CTS) frame that may repeat the information sent in the RTS frame. Any MP not involved in the transmission that receives the CTS frame, such as MP 108, may set a network allocation vector (NAV) period equal to the duration of the transmission identified in the CTS frame. During the NAV period, these MPs may not transmit so as to avoid possible interference with MP 104 receiving data from MP 102. Upon receiving the data, MP 104 may wait an IFS interval before broadcasting an acknowledge (ACK) frame to let MP 102 know that the data was successfully received.

While the RTS/CTS process described above helps solve the hidden node problem, once a wireless terminal obtains access to the medium it retains control until it releases the medium. This may lead to wireless terminals with slow transmission rates or large amounts of data hogging access to the wireless medium. The hogging of access to the wireless medium may lead to lengthy transmission of data flows with delay-sensitive applications such as streaming media or VOIP, which may result in jitter or other undesirable affects. Another issue with using the RTS/CTS process is that precious channel capacity is used; in this process that may be used for data transmission instead. Also, every RTS/CTS exchange being contention based access to the shared communication medium may potentially collide with other transmissions. Deterministic access to the shared communication: medium may save a lot of capacity if channel reservations are made once for deterministic accesses over time. The mesh deterministic access method disclosed in more detail below helps achieve the goal of creating deterministic access to the shared communication medium.

As an amendment to the 802.11 standard, the 802.11e specification has been provided in order to enable quality of service (QoS) enhancements, the contents of which are incorporated by reference in their entirety. The QoS enhancements provided in 802.11e specification are through an enhanced distributed channel access (EDCA) and hybrid coordinated function (HCF) controlled channel access (HCCA).

EDCA is a probabilistic approach to gaining access to the wireless medium. EDCA is described in detail by Gu, D.; Zhang, J., "Evaluation of EDCF Mechanism for QoS in IEEE 802.11 Wireless Networks", *World Wireless Congress* (WWC), May 2003 (WWC 2003), the content of which is incorporated by reference in its entirety. Since EDCA is based on the DCF and still uses the CSMA/CA with RTS/CTS process. EDCA modifies the DCF to provide four priority access categories with a higher priority given to delay-sensitive applications such as streaming media and VOIP and a lower priority given to applications such as e-mail. EDCA asserts the priorities in the event of a collision. That is, during the backoff process, the higher priority applications have a greater probability of selecting a lower number in the CW than lower priority applications his means that higher priority applications have a higher priority to, gain access to the wireless medium sooner. In order to increase a higher priority application's probability of gaining access to the wireless medium, two adjustments are made with EDCA. First, the size of the CW is variable, such that it is smaller for higher priority applications than for lower priority applications. Second, the time an application has to wait to begin transmitting data after determining that the wireless medium is: idle, the IFS period, is also variable. Similar to the CW, higher priority applications have a shorter IFS period than lower priority applications.

Since EDCA is a probabilistic approach to gaining access to the wireless medium then it is possible for high priority applications with a lot of data or multiple high priority applications transmitting data to essentially block low priority data from gaining access to the wireless medium in order to provide access to the wireless medium to all wireless devices, the HCCA polling process may be used similar to PCF. As with the PCF, there is a CFP and CP. During the CFP, the hybrid controller may poll the QoS nodes to allow these nodes to gain access to the wireless medium, and during the CP wireless devices may contend for the wireless medium using EDCA or the DCF. While this solution works well, it requires a centralized controller, such as a WAP, to schedule and perform the polling. As such, this solution may not be used in decentralized networks such as mesh networks. Therefore it is desirable to develop a more deterministic access mechanism for high QoS data transfers that :may be used in a decentralized wireless network. It is also desirable to not require support from all MPs in a wireless mesh network to simplify deployment and for backwards compatibility.

Additional information may be found in U.S. application Ser. No. 11/445,842, to Ariton Xhafa, filed Jun. 1, 2006, entitled "System and Method of Communication in Mesh Networks", and U.S. application Ser. No. 11/432,124, to Ariton Xhafa et al., filed May 11, 2006, entitled "Quality of Service Aware Robust Link State Routing for Mesh Networks", both of which are incorporated herein by reference for all purposes.

Referring to FIG. 1, a wireless mesh network comprises a plurality of wireless devices that act as network nodes, or mesh points (MPs) 102-118, that communicate data with each other. Each MP may be a fixed or mobile computing device and each MP may communicate with any other MP using any wireless communication standard or technique known to those skilled in the art. In one embodiment the communication between MPs may be according to the wireless communication standard IEEE 802.11s draft specification, the contents of which are herein incorporated by reference in its entirety.

Each MP may connect to several other MPs in a wireless mesh neighborhood. A wireless mesh neighborhood refers to the transmission range of a particular MP. Any MPs that are located within the wireless mesh neighborhood of a particular MP may communicate with the particular MP. For example, as shown in FIG. 1, MP 102 has a wireless mesh neighborhood 120 which includes MP 104 and MP 106. As such, MP 102 may communicate with either of MP 104 or MP 106. Similarly, MP 104 has a wireless mesh neighborhood 122 which includes MP 102 and MP 108, and MP 106 has a wireless mesh neighborhood 124 which includes MP 102, MP 110, and MP 112. It will be appreciated that while FIG. 1 only illustrates some MPs, more or fewer MPs and may be present.

As opposed to conventional wireless networks, a wireless mesh network is very reliable due to the decentralized nature of a mesh network. For example, if any one mesh point fails then data may simply be passed using a different route through other mesh points. Also, similar to peer-to-peer networks, the sharing of resources between each mesh point, such as sharing transmission bandwidth to pass data between mesh points, provides for scalability that increases available resources through each additional mesh point.

Each wireless mesh neighborhood may be referred to as a one-hop neighborhood since there is only one transaction, or hop, of data between a MP and any other MP in the one-hop neighborhood. A two-hop neighborhood refers to the combined wireless mesh neighborhood: of a particular MP and each of the MPs in the particular MP's neighborhood. For example, referring to FIG. 1, the two-hop neighborhood of MP 102 is the bolded circumference 126 of each of the neighborhoods 120-124 of MPs 102-106, respectively. In a two-hop neighborhood there may be up to two transactions, or hops, of data between a MP and any other MP in the two-hop neighborhood. For example, if data is to be sent from MP 102 to MP 110, then it may not happen directly. MP 110 is outside the transmission range or outside the wess mesh neighborhood 120, of MP 102 and as such, MP 102 nay not directly send data to MP 110. In order to transmit data between MP 102 and MP 110, one or more intervening MPs are used as relays to pass, or repeat, the data between MP 102 and MP 110. In the example of FIG. 1, the data must first be sent from MP 102 to MP 106 and then relayed from MP 106 to MP 110.

A hidden node refers to any MP that may be too far away for a particular MP to "see", that is any MP that may be outside the one-hop neighborhood of the particular MP. For example, referring to FIG. 1, MP 102, may not "see" any of MPs 108-118 since each of these MPs are outside the one-hop neighborhood of MP 102. As such, each of MPs 108-118 are hidden nodes from MP 102 in the wireless mesh network 100.

According to one embodiment, communication between any two neighboring MPs may be accomplished using one or more embodiments as disclosed herein which may be referred to as a mesh deterministic access (MDA). In a decentralized network, such as the mesh network of FIG. 1, there is no central controller to ensure access to the wireless medium to all MPs or to schedule access to the wireless medium to enable timely transfers periodic data -flows such as streaming media or VOIP. As such, each MP supporting the MDA in a wireless mesh network must perform the scheduling function of a central controller. That is, each supporting MP must be able to perform the setup, advertisement, and teardown of communication opportunities referred to as MDA Opportunities (MDAOP).

Figure 3A:
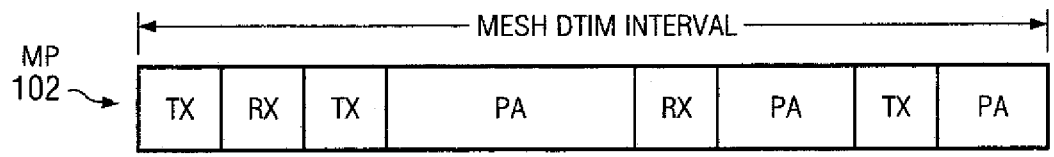
FIGS. 3A-3E illustrate exemplary MDA states for a MP.

MDAOPs may be scheduled during any available time within a Mesh Delivery Traffic Indication Message (Mesh DTIM) interval. FIG. 3A shows the current MDA state in the one-hop neighborhood of MP 102 within the Mesh DTIM interval. As shown in FIG. 3A, the MDA state identifies all of the scheduled transmission (TX) and reception (RX) MDAOPs in the one-hop neighborhood of MP 102 as well as all of the potentially available (PA) time remaining in the Mesh DTIM interval. The MDA state of MP 102 shown in FIG. 3A may be determined by MP 102 determining its own TX-RX state and receiving an advertisement of the TX-RX state described in more detail below from each of MPs 104 and 106 and combining the TX-RX state of all of MPs 102, 104 and 106.

Figure 3B:
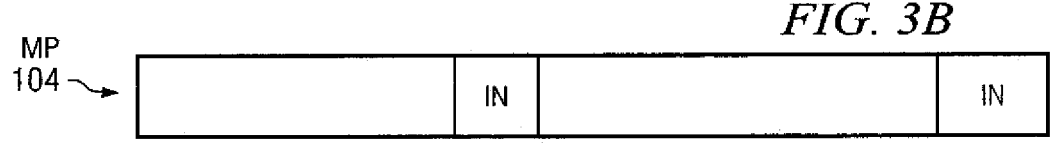
Figure 3C:
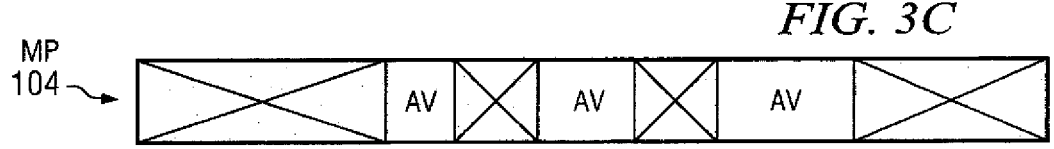
Figure 3D:
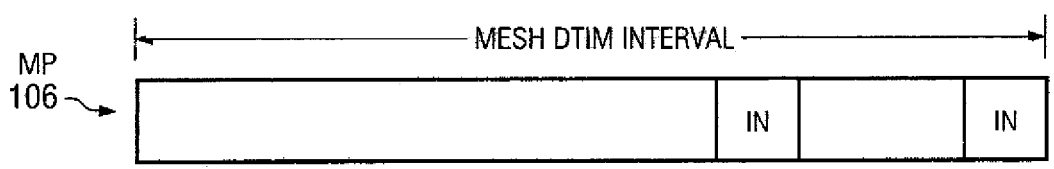
Figure 3E:
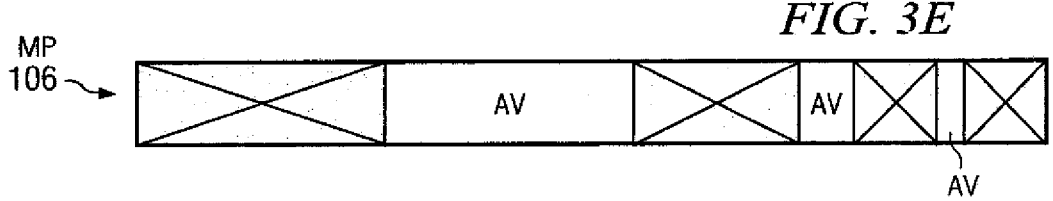

Due to the hidden node problem discussed above, in order to avoid potential interference, an interference state must also be advertised by each MP. For example, if MP 102 wants to establish an MDAOP with MP 104, any communication occurring with another MP in the one-hop neighborhood of MP 104 may interfere with communication between MPs 102 and 104. That is, if MP 108 communicates with MP 118 at the same time that MP 102 communicates with MP 104, then interference may occur at MP 104. Therefore the interference state of MP 104 does not identify the scheduled MDAOPs of MP 104, since these MDAOPs are already identified in the TX-RX state of MP 104, but rather identifies the scheduled MDAOPs of all of the other MPs in the one-hop neighborhood of MP 104. FIG. 3B illustrates an exemplary interference state of MP 104 that identifies all of the interfering (IN) MDAOPs. By combining the MDA state of FIG. 3A and the interference state of FIG. 3B the available state of MP 104 may be determined. The available state of MP 104 identifies the available (AV) times in the Mesh DTIM interval for MP 102 to communicate with MP 104 as shown in FIG. 3C. All of the crossed out time intervals indicate already scheduled MDAOPs with MPs 104 and 106 as well as interfering MDAOPs with MP 104. Similarly, FIG. 3D illustrates an exemplary interference state of MP 106 wherein, by combining the MDA state of FIG. 3A and the interference state of FIG. 3D, the available state of MP 106 may be determined. The available state of MP 106 identifies the available (AV) times in the Mesh DTIM interval for MP 102 to communicate with MP 106 as shown in FIG. 3E. Note that the available times to schedule an MDAOP between MP 102 and MP 104 shown in FIG. 3O are different than the available times to schedule an MDAOP between MP 102 and MP 106 shown in FIG. 3E.

Figure 4A:
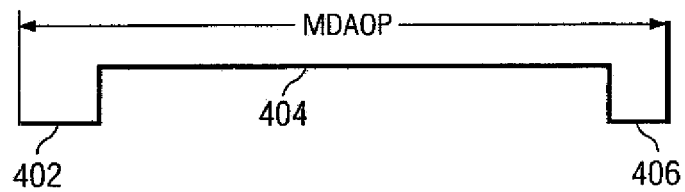
FIGS. 4A and 4B illustrate exemplary MDAOPs.

Each MDAOP is a unit of time during which a MP may transmit or receive as many data packets as possible. As shown in FIG. 4A, each MDAOP begins with an interval of time 402 during which a MP may establish a connection using the wireless medium. The establishment of the connection using the wireless medium may be accomplished through the CSMA/CA with RTS/CTS process or through any other process for communicating over a wireless medium. The interval of time 404 may be used to send or receive data. Note that while depicted as one long interval, there may be a plurality of packets of data communicated during interval 404 with appropriate IFS between each packet of data. During interval 406, the MP releases the connection with the wireless medium. Note that if a MP communicates all of the necessary data packets prior to the end of the MDAOP, then the MP may release the connection with the wireless medium early. Note that any other MPs not participating in the communication may set the NAV period to the duration of the MDAOP, wherein the NAV period may be shortened if a MP releases the connection with the wireless medium early.

Figure 4B:
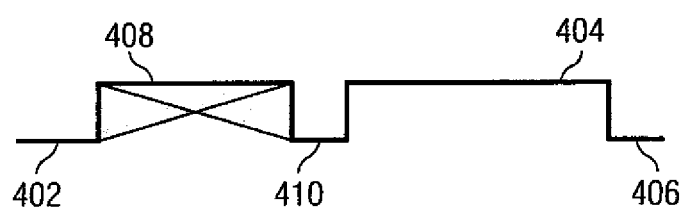

As shown in FIG. 4B, the scheduling of an MDAOP does not guarantee that no collisions or interference will occur. Collisions may occur because of the presence of legacy nodes or other nodes that are not capable of understanding the MDA mechanism attempting to communicate at the same time as an MDAOP. As shown in FIG. 4B, during interval 408 a collision has occurred, after which a backoff process may be executed during interval 410. Since the MP has previously scheduled the data communication then the MDA MP may be given a high priority. Similar to higher priority data packets using EDCA, the higher priority of a MDA communication may be asserted in two ways. First, the size of the CW may be smaller for the MDA MP since it is of higher priority. Second, the IFS period may be shorter for the MDA MP than for other MPs attempting to communicate during the MDAOP. As such, the MDA MP has a higher probability of regaining control of the wireless medium and continuing data communication in intervals 404 and 406 as discussed above.

As mentioned briefly above, each MP that supports MDA must be able to perform MDAOP setup, advertisement, and teardown. MDAOP setup may be performed by sending an MDAOP Setup Request Information Element (IE) from one MP to another that identifies at least the transmitting MP, the receiving MP, and a Mesh DTIM interval offset The Mesh DTIM interval offset may identify any available time identified by the transmitting MP. For example, if MP 102 wanted to setup an MDAOP with MP 104, then the Mesh DTIM interval offset may identify any of the available time periods shown in FIG. 3C. Note that the MDAOP SetupRequest IE may also specify the duration of the MDAOP up to a maximum MDAOP interval. Upon receiving a MDAOP Setup Request IE a MP may reply in a Setup Reply IE that indicates at least that the Setup Request is accepted or rejected. Alternatively, the Setup Reply IE may also include reasons for rejection and possible suggestions for other MDAOP times. Upon an MDAOP being successfully set up, both of the transmitting and receiving MPs need to advertise their new MDA state.

MDAOP Advertisement IE may include at least a TX-RX state and an interference state of the MP. The TX-RX state for a MP includes all of the MDAOP transmission and receptions scheduled to occur with the MP. Note that while the examples shown in FIGS. 3A-3E only indicate busy times as caused by transmissions or receptions, any other signals that can cause interference may also be reported in the TX-RX state. Some such other signals may include beacon signals, the HCCA times of a mesh access point (MAP), etc. The interference state includes all of the MDAOP communications between other MPs in the one-hop neighborhood of the MP as was described above. Newly connecting MPs or any other MP may request for another MP to broadcast their MDAOP Advertisement IE by sending a MDAOP Advertisement Request IE. Upon receiving the MDAOP Advertisement Request IE, a MP may broadcast their MDAOP Advertisement IE at the next available time. Note that MDAOP Advertisement IE may be broadcast at any time in the Mesh DTIM interval or at a specified time in the Mesh DTIM interval. The MDAOP Advertisement IE may be broadcast periodically. Alternatively, the MDAOP Advertisement IE may only be broadcast upon the MDA state or TX-RX state of a MP changing or upon receiving a MDAOP Advertisement request IE or at other times.

Once a data flow is completed it is important to tear down the MDAOP that was scheduled for that data flow in order to allow other MPs or data flows to utilize the time slot in the Mesh DTIM interval. Teardown may be initiated by either the sending or receiving MP by sending a MDAOP Teardown IE. The MDAOP Teardown IE may indicate at least the MDAOP that is being removed.

MDA MPs may be integrated with legacy mesh networks that contain MPs that do not support MDA. This may be accomplished by allowing any MP in the mesh network that does not support MDA to communicate via EDCA or DCF at any time. As noted above, the MDAOP communications are given a higher priority and as such are more likely to gain access to the wireless medium in the event of a collision with an EDCA or DCF communication. Further, during any available times in the Mesh DTIM interval, communication may take place using EDCA or DCF. Also note that some MPs may be a mesh access point (MAP) for connecting the wireless mesh network to a wired network or other network such as the internet. These MAPs may act as a hybrid controller to communicate via all of MDA, HCCA, PCF, DCF, and EDCA, for example.

Described below is one embodiment of the disclosure implemented in conjunction with the 802.11s standard. Table 1 shows the various elements that are in a wireless local area network (WLAN) Mesh Capability Element. Table 2 provides a description of each of the elements of Table 1.

TABLE 1

| Octets: | | | | | | | | | |
|---|---|---|---|---|---|---|---|---|---|
| 1 | 1 | 1 | 4 | 4 | 2 | 1 | 1 | 2 | 4 |
| ID | Length | Version | Active Protocol ID | Active Metric ID | Peer Capacity | Power Save capability | Synchronization Capability | MDA Capability | Channel Precedence |

TABLE 2

| Field | Value/description |
|---|---|
| ID | T.B.D |
| Length | Variable |
| Version | 1 |
| Active Protocol ID | Path selection protocol in use |
| Active Metric ID | Path selection metric in use |

TABLE 2-continued

| Field | Value/description |
|---|---|
| Peer capacity | Peer capacity value |
| Power Save capability | Support for power save operation and current power save status |
| Synchronization Capability | Support for synchronization services and current synchronization status |
| MDA Capability | Support for MDA services and current status |
| Channel precedence | Channel precedence value |

TABLE 3

| Bits: | | | | | |
|---|---|---|---|---|---|
| 0 | 1 | 2 | 3 | 4 | 5-7 |
| MDA Capable | MDA Active | MDA Active Requested in Mesh | MDA Not Allowed in Mesh | MDA EDCA Mixed Mode Enabled | Reserved |

The MDA Capability field in Table 1 includes 5 sub-fields as shown in Table 3. The MDA Capable subfield may be set to 1 if the Mesh Point supports MDA services, and 0 otherwise. The MDA active subfield may be set to 1 if the mesh point has MDA services active, and 0 otherwise. When set to 1, the MP provides full MDA services as described below. When set to 0, the MP does not interpret any frames described for MDA operation and does not provide any of the MDA services described below. This field is ignored and interpreted as 0, if MDA capable bit is set to 0. The MDA Active Requested in Mesh field may be set to 1 if the mesh requests that all MPs that are capable of MDA have MDA active, and to 0 otherwise. This is an informative flag and the participating MPs are not required to act on it. This field is ignored and interpreted as 0 if either of MDA Capable or MDA Active bits are set to 0. This field is a mesh wide field, and common for all MPs that belong to a single mesh. The MDA Not Allowed in Mesh subfield may be set to 1 if the mesh requires that all MPs participating in the mesh have MDA not activated, and 0 otherwise. If the MDA Not Allowed in Mesh field is set to 1, the MDA Active and MDA Active Required in Mesh fields are ignored and interpreted as 0. The MDA Not Allowed in Mesh field is a mesh wide field, and common for all MPs that belong to a single mesh. If MDA Not Allowed in Mesh field is set to 1 in a mesh, any new MP that wishes to participate in the mesh is required to not use/invoke MDA services. The MDA EDCA Mixed Mode Enabled field may be set to 1, if MDA traffic may be transmitted using EDCA access along with MDA access, and 0 otherwise. If the MDA EDCA Mixed Mode Enabled filed is set to 0, any flow that is set to access channel using MDA may only transmit during MDAOPs of the transmitter MP. When the MDA not allowed in Mesh field is set to 0, MPs that are capable of providing: MDA services may use MDA in the Mesh for portions of their traffic.

TABLE 4

| Element ID | Length | MDAOP Set ID | Final Destination MAC Address | Number of Individual MDAOPs | MDAOP Info 1 | ... | MDAOP Info n | Periodic MDAOP info 1 | ... | Periodic MDAOP info m |
|---|---|---|---|---|---|---|---|---|---|---|
| (1 byte) | (1 byte) | (1 byte) | (6 bytes) | (1 byte) | (3 bytes) | | (3 bytes) | (variable bytes) | | (variable bytes) |

An MDAOP Setup Request IE is used by an MP to request the setup of a set of MDAOPs, identified by a single MDAOP Set-ID, between itself (transmitter) and a receiver. This IE is unicast transmitted in MDA action frames. The format of the IE is as shown in table 4. The MDAOP Set ID field is an eight bit unsigned number that represents the ID for the requested Set. The Final Destination MAC (Media Access Control) Address field is an informative field to indicate the ultimate destination address to the immediate receiver. The address received in this field may be used by the immediate receiver to setup MDAOPs of its own for the next hop.

TABLE 5

| MDAOP Duration | MDAOP Offset |
|---|---|
| (1 byte) | (2 bytes) |

The Number of Individual MDAOPs field specifies the number of MDAOP Info fields following R. The format of the MDAOP Info field is specified in table 5. Each MDAOP Info field specifies the duration and location of a specific MDAOP in the Mesh DTIM interval. The MDAOP Duration field may specify the duration of the MDAOP in multiples of 32 µs, for example. The MDAOP Offset field specifies the location of the MDAOP beginning from the beginning of a Mesh DTIM Interval.

TABLE 6

| Periodic MDAOP duration | Periodicity | Number of offsets | $Offset_1$ | ... | $Offset_N$ | Padding if required |
|---|---|---|---|---|---|---|
| (1 byte) | (1 byte) | (4 bits) | (12 bits) | | (12 bits) | (4 bits) |

Figure 5:
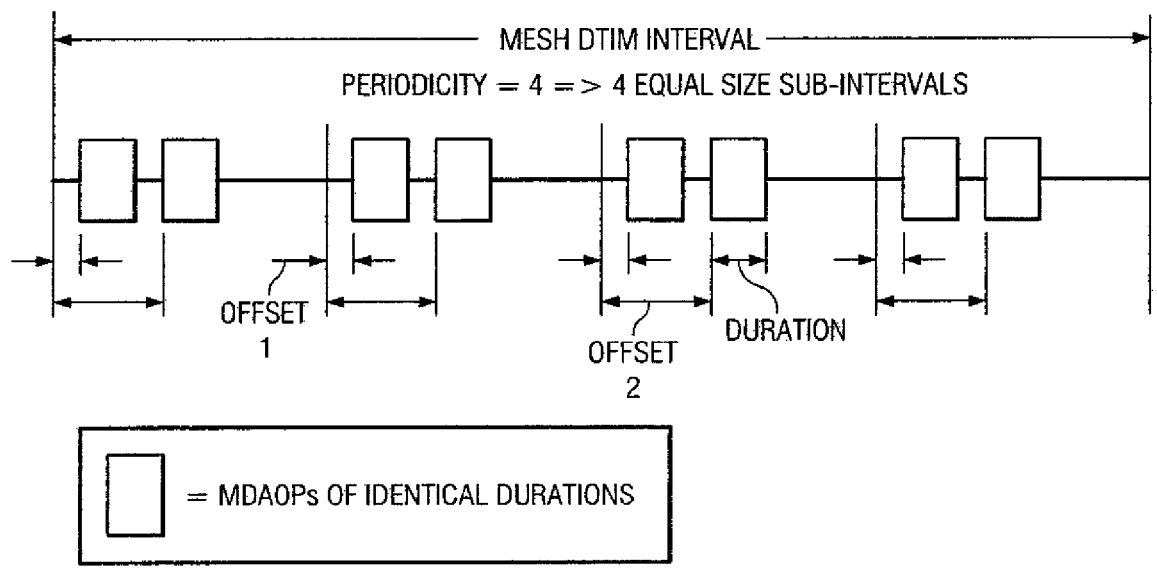
FIG. 5 illustrates an exemplary periodicity of MDAOPs.

The format of the Periodic MDAOP Info field in Table 4 is specified in table 6. Each Periodic MDAOP Info field specifies information about a set of MDAOPs, each with identical periodicity within the Mesh DTIM interval, and identical durations. The Periodic MDAOP Duration field specifies the duration of each of the MDAOPs specified in the field in multiples of 32 µs. The Periodicity field specifies the number of times the specified MDAOPs repeat themselves equidistantly within a Mesh DTIM interval. The Number of Offsets field specifies the number of Offset fields following it. Each offset field specifies the position of an MDAOP beginning from the beginning of the Mesh DTIM interval. Since each of these MDAOPs repeat with a periodicity, the same offset is used from the beginning of each of the sub-intervals within the Mesh DTIM interval. The padding field is 4 bits, and is used to round the IE to the nearest byte. An example of periodicity, duration, and offsets values for a Periodic MDAOP Info field is shown in FIG. 5.

TABLE 7

| Element ID | Length | MDAOP Set ID | Reply Code | Alternate suggested Request IE |
|---|---|---|---|---|
| (1 byte) | (1 byte) | (1 byte) | (1 byte) | (variable length) |

An MDAOP Setup Reply element is used by a MP to reply to an MDAOP Setup Request. Its format is as shown in table 7. This IE is unicast transmitted in MDA action frames. The reply code is 0 to accept the request, and any odd number to reject the request. The request code of 1 is used to indicate that the rejection is due to a bad choice of MDAOP locations within the Mesh DTIM interval. The rest of the code values are reserved for future use. The Alternate Suggested Request IE field includes a suggested format of the MDAOP Setup Request IE without the length and element ID fields, so that the setup request may be accepted. This field is an optional field and is only included/interpreted when the reply code indicates rejection.

TABLE 8

| Element ID | Length |
|---|---|
| (1 byte) | (1 byte) |

An MDAOP Advertisements Request element is used to request MDA advertisements from neighbors, one neighbor at a time. The IE may only be carried in an MDA action frame that is unicast. On the receipt of this IE, the receiver is required to broadcast its MDAOP advertisements using the MDAOP advertisements IE. The format of the IE is shown in table 8.

TABLE 9

| Element ID | Length | MDA Access fraction | MDA Access fraction limit | TX-RX times report | Interfering times report |
|---|---|---|---|---|---|
| (1 byte) | (1 byte) | (0.5 byte) | (0.5 bytes) | (variable bytes) | (variable bytes) |

The MDAOP Advertisements Information Element is used by an MP to advertise its MDA state to its neighbors. This IE may be carried in selected beacons with any chosen frequency. This IE may also be broadcast in an MDA action frame. The format of the MDAOP Advertisement IE is as shown in table 9. MDA Access Fraction and MBA Access Fraction Limit fields are both 4 bit unsigned number fields. They denote a positive fraction equal to the values of the fields times ($1/16$). The MDA Access Fraction field represents the current value of MBA Access Fraction at the MP rounded down (floor) to the nearest multiple of ($1/6$). The MDA Access Fraction Limit field represents the maximum MDA access fraction allowed at the MP. This number is always a multiple of ($1/16$). The TX-RX Times Report field is a variable length field that advertises the times in the Mesh DTIM interval that are busy for the MP as a transmitter or a receiver. These times may include known and otherwise un-advertised transmission and reception times besides MDAOPs. For example, an MAP may include its HCCA times in the advertisement.

The Interference Times Report field is identical in format to the TX-RX times report field. However, through this field, an MP reports the times when one of its neighbors are in TX or RX as reported by their (neighbors') TX-RX times report fields. This field may not include any times for which the MP is a transmitter or receiver (Such times are taken care of in the TX-RX times report). The Interfering Times reported may not be used to transmit through MDA to the reporting MP because there may be interference between any such transmission sequence and the transmission sequences already setup for the reported times. However, these reported times may possibly be used for transmissions through MDA to other MPs.

TABLE 10

| Number of Individual MDAOPs | MDAOP Info 1 | ... | MDAOP Info n | Periodic MDAOP info 1 | ... | Periodic MDAOP info m |
|---|---|---|---|---|---|---|
| (1 byte) | (3 bytes) | | (3 bytes) | (variable bytes) | | (variable bytes) |

The format of the TX-RX Times and the Interference Times Report field is shown in table 10. The fields involved are similar to the fields involved in the MDAOP Setup Request element, and are described above. Note that while the fields are the same as MDAOP setup request element, the TX-RX times and Interfering times reports can more efficiently report information compared to MDAOP setup request IEs. This is possible because MDAOPs of different MDAOP Sets may be all combined in an efficient way and reported. MDAOP Set IDs are not reported in the advertisements.

TABLE 11

| Element ID | Length | MDAOP Set ID | MDAOP Set Owner |
|---|---|---|---|
| (1 byte) | (1 byte) | (1 byte) | (6 byte) |

The MDAOP Teardown Information Element is as shown in table 11, and is used to indicate the peer of teardown of an MDAOP Set. An MDAOP Set teardown IE may be transmitted by either the transmitter or the receiver of the MDAOP Set to tear it down. The MDAOP Set Owner field is an optional field that indicates the MAC address of the owner (transmitter) of the MDAOP Set. This field is only included if the IE is transmitted by the receiver in an MDAOP set, to tear it down. The MDAOP teardown element may be transmitted in beacons or MDA action frames. When received in broadcast frames (e.g. beacons), the MDAOP Set Owner field is ignored, even if it is present.

MDA is an optional access method that allows supporting MPs to access the channel with lower contention than otherwise in selected times. The method sets up time periods in mesh neighborhoods when a number of MDA supporting MPs that may potentially interfere with each others transmissions or receptions are set to not initiate any transmission sequences. For each such time period, supporting MPs that set up the state for the use of these time periods are allowed to access the channel using MDA access parameters (CWMin, CWMax, and AIFSN). In order to use the MDA method for access, an MP may be a synchronizing MP. The MDA method is described in detail below.

An MDAOP is a period of time within every Mesh DTIM interval that is set up between a transmitter and a receiver such that the following are satisfied. Once an MDAOP is setup, the transmitter that sets up the MDAOP uses CSMA/CA and backoff to obtain a TXOP as described in 802.11e and using parameters MDACWmin (Mesh Deterministic Access Contention Window minimum), MDACWmax (Mesh Deterministic Access Contention Window maximum), and MDAIFSN. The ranges of values allowed for MDACWMin, MDACWMax, and MDAIFSN parameters are similar to that allowed for EDCA in 802.11e. Also, once the setup of an MDAOP is advertised, all MPs that hear these advertisements except the transmitter that set up the MDAOP are required to not initiate any new transmission during the TXOP initiated in the MDAOP. This can be done by setting their NAVs for the duration of the MDAOP at the beginning of the MDAOP, or by using enhanced carrier sensing (ECS) that achieves the same result.

A set of MDAOPs may be setup for unicast transmissions from a transmitter to a receiver by the transmitter. Such a set is identified by a unique ID called the MDAOP Set ID. The MDAOP Set ID has to be unique for a transmitter, so that the MDAOP set ID and the transmitter (or set owner) MAC address uniquely identifies an MDAOP set in the mesh. The MDAOP set ID is a handle that allows operation such as setup and teardown to be conducted together for the entire set of MDAOPs in an MDAOP set. An example use of MDAOP set concept is to establish an MDAOP set for a single QoS flow. MDAOP set ID may be an 8 bit unsigned number. The special value of MDAOP set ID, when all bits are set to 1 is reserved to mean all MDAOPs.

A TXOP that is obtained by an MP by using MDA parameters in an MDAOP is called an MDA TXOP. An MDA TXOP is required to end within the MDAOP in which it was obtained. Thus, an MDA TXOP ends latest either by MDA TXOP limit time after it began or by MDAOP end time, whichever is earlier.

At a neighborhood centered at an MP, all the TX-RX times reported by its neighbors (in their MDAOP advertisements) form a set of MDAOPs that are already being used in the neighborhood. No new MDAOPs may be set up by the MP during these times. These times are referred to as Neighborhood MDAOP times for the MP. In effect, Neighborhood MDAOP Times at an MP include all MDAOPs for which the MP and its neighbors are either the transmitters or receivers.

The Interfering times reported by an MP in its MDAOP advertisements are times that may not be used for a new MDAOP with that specific MP. While the MP itself is not the transmitter or receiver in an MDAOP during these times, one of its neighbors is. Any new MDAOPs to the MP during these times may experience interference. However, new MDAOPs may be setup with another MP during these interfering times. Thus, for every neighbor, there is a set of times that are interfering. These times are referred to as Neighbor MDAOP interfering times for that neighbor.

The MDA access fraction at an MP is the ratio of the total duration of its 'Neighborhood MDAOP Times' (see definition above) in a Mesh DTIM interval to the duration of the Mesh DTIM interval. This parameter may be used to limit the use of MDA in a neighborhood centered at an MP to a certain fraction of the total channel time. The maximum value for MAF that is allowed at an MP is specified by the dot11MAFlimit (802.11 MDA Access Fraction limit) parameter.

The dot11MAFlimit is copied in the MDA Access Fraction Limit field of the MDAOP Advertisements FE. Before attempting to set up an MDAOP Set with a neighbor, an MP is required to make sure that the new MDAOP set does not cause the MAF of any of its neighbors to exceed their MAF limit. An MDAOP setup request may be refused by the intended receiver if the MAF limit of any of its own neighbors is exceeded due to the new setup.

TABLE 12

| Order | Information |
|-------|-------------|
| 1 | Category |
| 2 | Action |
| 3 | One or more MDA IEs |

The IEs that are used for MDA may be carried in action frames. The format of such action frames that carry the IEs, and called the MDA frame is shown in table 12. MDA action frames are always sent with immediate ACK (acknowledge) policy. The Category and Action fields are followed by one or more IEs related to MDA operation, specifically MDAOP Setup Request, MDAOP Setup Reply, MDAOP Set Teardown, MDAOP Advertisements Request, and MDAOP Advertisements IEs.

The setup of an MDAOP set is initiated by the intended transmitter, and is accepted/rejected by the intended receiver. Once accepted, the transmitter is referred to as the owner of the MDAOP. The setup procedure for an MDAOP set is as follows. The MP that intends to be the transmitter in a new MDAOP set builds a map of Neighborhood MDAOP times in the Mesh DTIM interval after hearing Advertisements from all of its neighbors that have MDA active. If no advertisement was heard from a neighbor in the last dot11MDAdvertPerodMax, the transmitter MP may request the neighbor for MDAOP Advertisement. The intended transmitter MP also considers the Neighbor MDAOP Interfering Times of the intended receiver. Based on traffic characteristic, the transmitter MP then chooses MDAOP locations and durations in the Mesh DTIM interval that do not overlap with either its Neighborhood MDAOP Times or the Neighbor MDAOP Interfering Times of the intended receiver. The transmitter MP also avoids using times that are known to it as being used by itself or one of its neighbors for other activities such as beacons transmissions. The transmitter MP then verifies that the new MDAOP Set will not cause the MAF limit to be crossed for any of its neighbors. If MAF limit would be crossed for any of its neighbors, due to the new MDAOP Set, it suspends the setup process. If the MAF limits at all neighbors are respected despite the new MDAOP set, it transmits an MDAOP Setup request IE to the intended receiver with chosen MDAOP locations and durations. The receiver of the MDAOP Setup Request IE checks to see if the proposed MDAOP times have any overlap with its Neighborhood MDAOP Times. The receiver also checks if the new MDAOP Set will cause the MAF limit to be crossed for any of its neighbors. The MDAOP Setup Reply IE is used to reply to a setup request. The receiver rejects the setup request if there are any overlaps of the requested MDAOP set with its. Neighborhood MDAOP Times, or other times that it knows are set to be used by itself or its neighbors for activities such as beacon transmissions. The receiver MP may suggest alternate times by including the optional field Alternate Suggested Request WE in the MDAOP Setup Reply element. The receiver also rejects the setup request if the MAF limit of itself or any of its neighbors will be exceeded due to the new setup.

If suitable, the receiver accepts the setup. After successful setup, both the MDAOP owner (the transmitter) and the receiver advertise the MDAOP Set times in the TX-RX Times Report field of the MDAOP Advertisement IE.

Every MP that has MDA active is required to advertise TX-RX and Interfering times using the MDAOP Advertisements IE, at least once in dot11MDAdvertPeriodMax. These advertisements are always transmitted in broadcast frames; either in beacons or MDA action frames. The advertised times include a TX-RX times report that indicates all MDAOP times for which the MP is the transmitter or the receiver and all other times that it knows are busy/reserved such that it is either the transmitter or the receiver. A non exhaustive list includes expected HCCA times for an MAP and self or neighbors expected beacon times. The advertised times also includes an Interfering times report that indicates all TX-RX times reported by the MP's neighbors so that the MP is neither the transmitter nor the receiver during those times.

An MDAOP set is successfully torn down, once both the transmitter and the receiver stop advertising the set in their TX-RX times. Either the transmitter or the receiver may indicate a teardown by transmitting the MDAOP Set Teardown IE to the other communicating end (transmitter or the receiver). The teardown is assumed successful once the ACK is received, or maximum retry attempts are exceeded.

The transmitter assumes a successful teardown and stops using or advertising (in TX-RX times report) an MDAOP set if any of the transmitter MDAOP Set Teardown IE is successfully ACKed, the maximum retries for the teardown IE the transmitter is transmitting are exceeded, the receivers advertisement does not include the MDAOP set, or the receiver is unreachable for greater than dot11MDAOPtimeout time.

The receiver assumes a successful teardown and stops advertising an MDAOP set if any of the receivers MDAOP Set Teardown IE is successfully ACKed, the maximum retries for the teardown IE it is transmitting are exceeded, the transmitters advertisement does not include the MDAOP set, or the transmitter is unreachable for greater than dot11MDAOPtimeout time. The interfering times are directly derived from neighbors' TX-RX times report. The interfering times report reflects the latest TX-RX times reports from the neighbors.

MPs that have MDA active maintain the Neighborhood MDAOP Times state of MDAOPs when either they or their neighbors are transmitters or receivers. The access behavior for such MPs during the Neighborhood MDAOP Times is described as below.

If the MP is the owner of the MDAOP, it attempts to access the channel using CSMA/CA and backoff using. MDACWmax, MDACWmin, and MDAIFSN parameters. If the MP successfully captures an MDA TXOP, before the end of its MDAOP, it may transmit until the end of the MDAOP or until a time less than MDA TXOP limit from the beginning of the MDA TXOP, whichever is earlier. The retransmission rules for access in an MDAOP are similar to that of EDCA in 802.11e. Specifically, if there is loss inferred during the MDA TXOP, retransmissions require that a new TXOP be obtained using the MDA access rules in the MDAOP. No MDA TXOPs may cross MDAOP boundaries. If the MP intends to end the TXOP- with enough time before the end of the MDAOP, it is responsible for relinquishing the remaining MDAOP time by using any of the methods that reduce NAV as defined in 802.11e and 802.11. The MP shall not use MDA access parameters to access the channel outside of MDAOPs owned by it.

At the beginning of an MDAOP that is not owned by the MP (it is not the transmitter) but is part of the Neighborhood MDAOP Times, the MP sets its NAV to the end of the MDAOP. Instead of setting the NAV, the MP can also use other means to not initiate any new transmission sequence during the MDAOP. The NAV setting may be reduced to a shorter time on the receipt of certain frames through any of the methods currently available in 802.11 or 802.11e. MPs may then attempt channel access even before the end of MDAOP through access mechanisms other than MDA.

Figure 6:
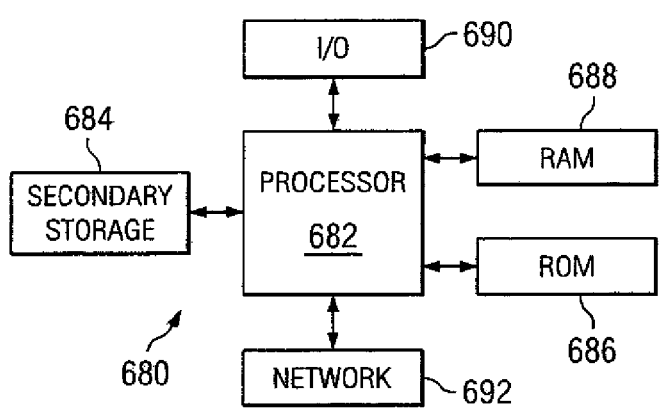
FIG. 6 illustrates an exemplary general purpose computer system suitable for implementing the several embodiments of the disclosure.

Each of the mesh points described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) 690 devices, and network connectivity devices 692. The processor may be implemented as one or more CPU chips.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage. The RAM 688 is used to store volatile data and perhaps to store instructions. Access to both ROM 686 and RAM 688 is typically faster than to secondary storage 684.

I/O 690 devices may include printers, video monitors, liquid crystal displays (LCDs), touch screen displays, keyboards, keypads, switches dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (PLAN) cards, radio transceiver cards such as code division multiple access (CDMA) and/or global system for mobile communications (GSM) radio transceiver cards, and other well-known network devices. These network connectivity 692 devices may enable the processor 682 to communicate via, a wired or wireless connection with an Internet or one or more intranets. With such a network connection, it is contemplated that the processor 682 might receive information from the network, or might output information to the network in the course of performing the above-described methods. Such information, which is often represented as a sequence of instructions to be executed using processor 682, may be received from and outputted to the network, for example, in the form of a computer data signal embodied in a carrier wave Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity 692 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692.

While several embodiments have been provided in the disclosure, it should be understood that the disclosed systems and methods may be embodied in many other specific forms without departing from the spirit or scope of the disclosure. For example, while the disclosure above was particularly directed toward a wireless mesh network, the above disclosure may be applied to any mesh or decentralized wired or wireless network with a plurality of network nodes. The examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined with each other or integrated with other systems, modules, techniques, or methods without departing from the scope of the disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for communicating in a decentralized wireless network, comprising:
    determining a schedule of communication times of a first node in the network;
    advertising the schedule of communication times of the first node;
    determining a schedule of communication times of one or more nodes adjacent to the first node;
    and advertising the schedule of communication times of the one or more adjacent nodes asserting a higher priority for scheduled communication times than for communication by adjacent nodes not supporting scheduled communication times,
wherein:
    adjacent nodes not supporting schedules of communication times may communicate at any time.

2. The method of claim 1, wherein:
the higher priority is asserted by maintaining a smaller inter-frame spacing interval and contention window for scheduled communication times than for other communications.

* * * * *